United States Patent
Thompson

(10) Patent No.: US 9,569,289 B2
(45) Date of Patent: Feb. 14, 2017

(54) GENERIC DISTRIBUTED PROCESSING FOR MULTI-AGENT SYSTEMS

(71) Applicant: Introspective Power, Inc., Broomfield, CO (US)

(72) Inventor: Anthony Scott Thompson, Broomfield, CO (US)

(73) Assignee: INTROSPECTIVE POWER, INC., Broomfield, CO (US)

( * ) Notice: Subject to any disclaimer, the term of this patent is extended or adjusted under 35 U.S.C. 154(b) by 39 days.

(21) Appl. No.: 14/523,701

(22) Filed: Oct. 24, 2014

(65) Prior Publication Data

US 2015/0074173 A1    Mar. 12, 2015

Related U.S. Application Data

(63) Continuation of application No. 14/171,143, filed on Feb. 3, 2014, now Pat. No. 8,898,218.

(60) Provisional application No. 61/759,864, filed on Feb. 1, 2013.

(51) Int. Cl.
| | |
|---|---|
| *G06F 15/16* | (2006.01) |
| *G06F 9/54* | (2006.01) |
| *H04L 29/08* | (2006.01) |

(52) U.S. Cl.
CPC ............ *G06F 9/542* (2013.01); *G06F 9/541* (2013.01); *H04L 67/10* (2013.01)

(58) Field of Classification Search
CPC ........... G06F 9/541; G06F 9/542; H04L 67/10
USPC ... 709/202, 201, 203; 706/10–12, 14–16, 61
See application file for complete search history.

(56) References Cited

U.S. PATENT DOCUMENTS

| | | | |
|---|---|---|---|
| 5,822,585 A | 10/1998 | Noble et al. | |
| 6,088,689 A * | 7/2000 | Kohn ................. | G05B 13/0265 706/10 |
| 7,043,522 B2 | 5/2006 | Olson et al. | |
| 7,146,232 B2 | 12/2006 | Staron et al. | |
| 7,742,436 B2 | 6/2010 | Carrillo et al. | |
| 8,095,923 B2 | 1/2012 | Harvey et al. | |
| 8,260,739 B1 | 9/2012 | Pelletier | |
| 2002/0016639 A1* | 2/2002 | Smith .................... | G05B 15/02 700/9 |
| 2002/0147737 A1 | 10/2002 | Todokoro et al. | |
| 2007/0112574 A1 | 5/2007 | Greene | |
| 2008/0222243 A1 | 9/2008 | Shaw | |
| 2008/0261600 A1 | 10/2008 | Somasundaram et al. | |

(Continued)

FOREIGN PATENT DOCUMENTS

CN    102130503 A    7/2011

OTHER PUBLICATIONS

Green et al., "Software Agents: A Review" (Broadcom Ireland May 27, 1997).

(Continued)

*Primary Examiner* — Frantz Jean
(74) *Attorney, Agent, or Firm* — Nixon & Vanderhye P.C.

(57) ABSTRACT

Generic Distributed Processing Unit (DPU) for Multi-Agent Systems (MAS) provides a Machine to Machine (M2M) interface that is fast, flexible, redundant and scalable. It allows the handling of unlikely edge cases that Human Machine Interfaces (HMI) cannot. It also allows the processing of excessive amounts of ancillary data that are not processed easily with an HMI arrangement. In the digital ecosystem, any like DPU can back up any other, making the system exceedingly robust.

21 Claims, 18 Drawing Sheets

(56) References Cited

U.S. PATENT DOCUMENTS

| | | | |
|---|---|---|---|
| 2010/0063614 A1* | 3/2010 | Rosenboim | G05B 19/4184 700/121 |
| 2012/0072480 A1 | 3/2012 | Hays et al. | |
| 2012/0079066 A1 | 3/2012 | Li et al. | |
| 2012/0089523 A1 | 4/2012 | Hurri et al. | |
| 2012/0278549 A1 | 11/2012 | Dutton et al. | |
| 2012/0310424 A1 | 12/2012 | Taft | |
| 2012/0311614 A1 | 12/2012 | DeAnna et al. | |

OTHER PUBLICATIONS

Rad et al., "Computational Grid as an Appropriate Infrastructure for Ultra Large Scale Software Intensive Systems" 2010 International Conference on Complex, Intelligent and Software Intensive Systems, pp. 469-474 (IEEE Computer Society 2010).

Schmidt et al., "Pattern-Oriented Software Architecture, Patterns for Concurrent and Networked Objects, vol. 2," J. Wiley & Sons, 2000, ISBN 0471606952.

Shirazi et al., "Scheduling and Load Balancing in Parallel and Distributed Systems," IEEE Computer Society Press, 1995, ISBN 0-8186-6587-4.

St. John, "Silver Spring Promises the Grid Network as Computing Platform: Reimagining the role of smart meters, grid sensors, home energy monitors and other devices at the grid edge" (Greentech Media Jan. 27, 2014).

Tanenbaum, "Distributed Operating Systems," Prentice Hall, Inc., 1995, ISBN 0-13-219908-4.

Thompson, "Concepts in Modular Computing Design for Complex Systems," Thesis submitted to the University of Colorado at Denver, 2002.

Tordsson, "Portable Tools for Interoperable Grids: Modular Architectures and Software for Job and Workflow Management" PhD Thesis (Umea University Sweden Mar. 2009).

International Search Report and Written Opinion of the International Searching Authority mailed Jul. 1, 2014, issued in corresponding International Application No. PCT/EP2014/014438.

* cited by examiner

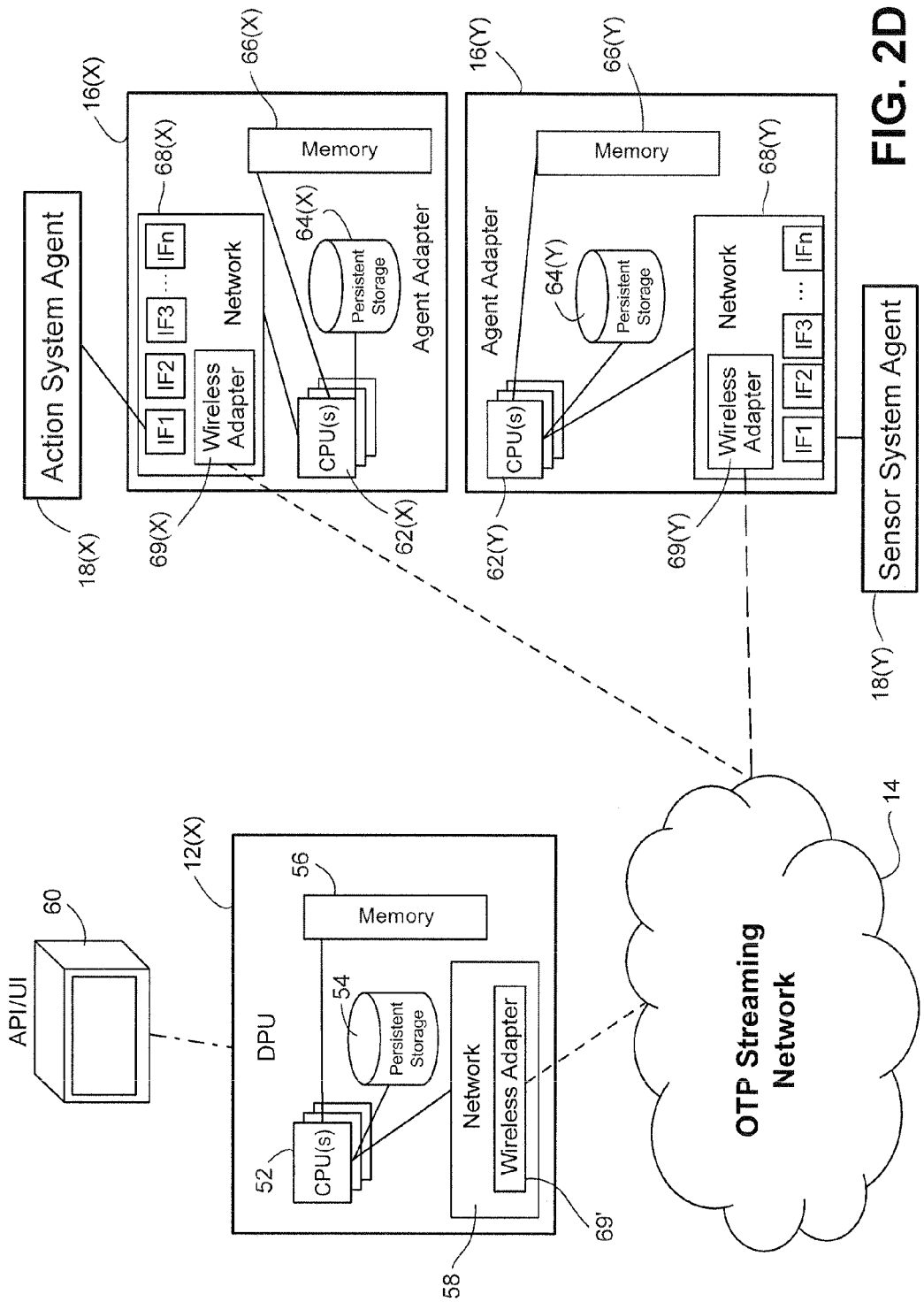

*Agent Adapter DPU Registration*

*Event Processing*

*Event Processor to Reactor
(DPU Internal) Registration*

GENERIC DISTRIBUTED PROCESSING FOR MULTI-AGENT SYSTEMS

CROSS-REFERENCE TO RELATED APPLICATIONS

This application is a continuation of U.S. patent application Ser. No. 14/171,143 filed Feb. 3, 2014, now U.S. Pat. No. 8,898,218 issued Nov. 25, 2014; which claims the benefit of U.S. Provisional Patent Application No. 61/759,864 filed Feb. 1, 2013. The disclosures of the prior applications are incorporated herein in their entirety by reference.

STATEMENT REGARDING FEDERALLY SPONSORED RESEARCH OR DEVELOPMENT

None.

FIELD

The technology herein relates to multi-agent processing, and to systems and methods providing robust coordination and control for multi-agent architectures.

BACKGROUND

Many industries use distributed, heterogeneous systems to make up larger multi-agent ecosystems. For the most part, coordination of these systems is managed manually with the control agents being humans. In some cases, humans cannot react fast enough. In other cases, the solution is not sufficiently robust and does not have an adequate backup. Also, human based systems are generally hard to scale. Facilities for humans are expensive to build and take time to construct. Training people for complex tasks is expensive, takes time and may not be possible or entirely effective for critical, rarely encountered edge cases. In disaster situations, these limitations can compound already trying situations.

Many existing systems, for the most part, work with heterogeneous equipment or a subset of all the equipment, and have little automation. Some solutions are not sufficiently flexible and have a concept of centralized control with a single master server/process. Other systems also depend on a Human Machine Interface (HMI) that requires users to process large data sets quickly. Still other solutions are not sufficiently robust due to manual processes, single point of failure and/or minimal redundancy. Most solutions have poor heterogeneous support working for one vendor and/or long lead times for new support.

The technology herein addresses these and other problems.

BRIEF DESCRIPTION OF THE DRAWINGS

The following detailed description of exemplary non-limiting illustrative embodiments is to be read in conjunction with the drawings of which:

FIGS. 2A-2D are more detailed block diagrams of the example non-limiting system;

DETAILED DESCRIPTION OF EXAMPLE NON-LIMITING EMBODIMENTS

The technology herein provides a generic Distributed Processing Unit (DPU) for use in a wide area Multi-Agent Systems (MAS) architecture. This solution can be applied to a MAS of any size, from a single micro or other processor to a digital ecosystem spanning the globe. Example non-limiting embodiments provide unified control over a collection of discrete elements and/or acts as a System of Systems (SoS) controlling other control systems. DPU technology can also be applied recursively or contain a hierarchy of implementations. In this way, the DPU can be a framework for creating a digital MAS and can be used to create Software, Hardware or hybrid Agents to control existing System Elements. Example embodiments react to conditions created either by events in the controlled digital ecosystem or external events that will affect that digital ecosystem.

In more detail, a distributed processing and control architecture can comprise a number of intelligent or other elements distributed across a network, geography, an enterprise or any other domain. Intelligent elements such as Agents and/or Agent Adapters may generate and supply events for handling by the distributed processing and control architecture. For example, such Agents and/or Agent Adapters may interface with machines or other apparatus of any type, complexity or functionality. In one example non-limiting implementation, the Agents and/or Agent Adapters may discover distributed processing units by for example setting up intentional race conditions and determining lowest response latency. Example distributed processing unit event processing can include for example:

receiving an event from an agent;
transforming the event;
dispatching event to handlers;
handling the event;
discovering a further agent; and
sending the agent commands for action and response.

Figure 1:
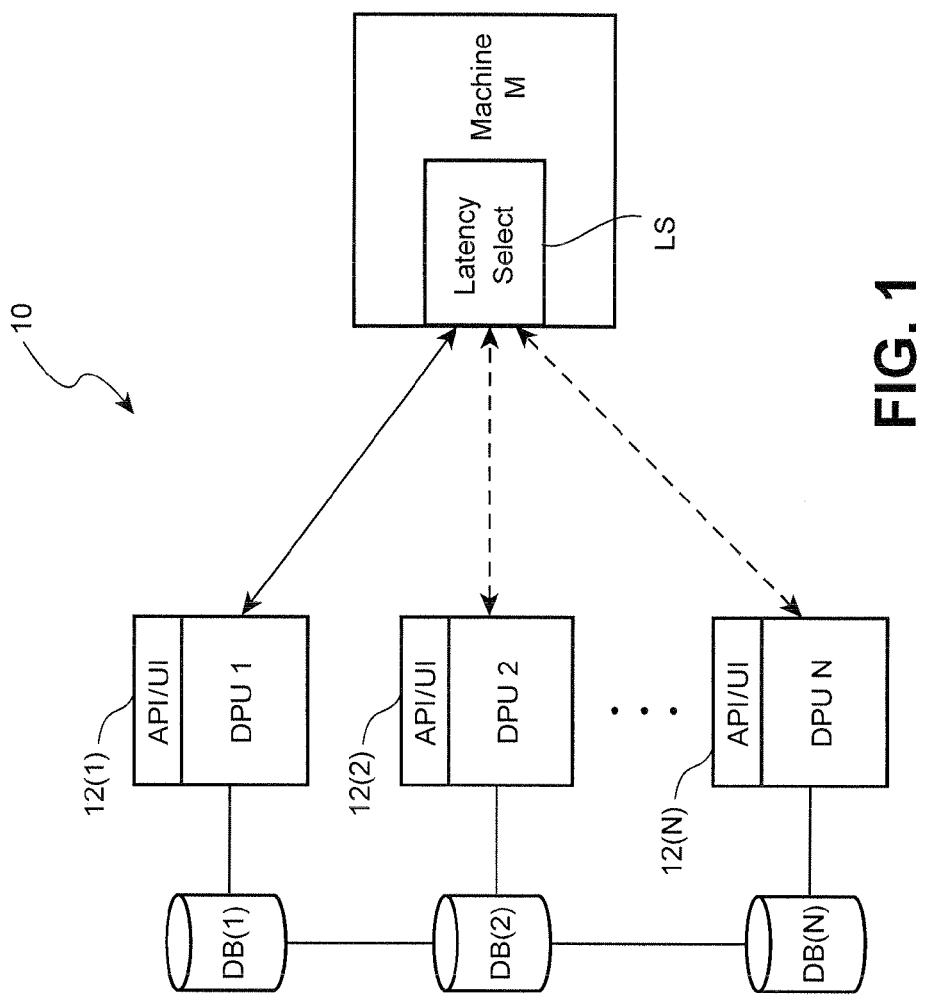
FIGS. 1 and 1A are block diagrams of example non-limiting simplified systems.

FIG. 1 shows a non-limiting example of a simplified distributing processing system of the type described above. FIG. 1 shows that any number of DPUs 12(1), 12(2), . . . 12(n) can communicate with one or more machines M. Machine M can be any form of controller, agent, Agent Adapter, and/or system of arbitrary breadth and/or complexity. As one specific example, machine M can comprise a node associated with a power delivery network.

In the example shown, each DPU 12 has or communicates with an associated database DB. Thus, DPU 12(1) can access database DB(1), DPU 12(2) can access database DB(2), and DPU 12(N) can access database DB(N) (N can be any integer greater than one). In one embodiment, database DB(1) is local to DPU 12(1), database DB(2) is local to DPU 12(2) and so on. As shown in FIG. 1, a communications path C can exist between the databases DB(1), DB(2), . . . DB(N). Communications path C can comprise any type of path including wired, wireless, networked, optical, radio, local, long distance, wide area, the Internet, sneaker net, telephone or any other kind of path that can communicate information between the databases DB(1), DB(2), . . . DB(N). Communications path C allows databases DB(1), DB(2), DB(N) to synchronize with and/or update with respect to one another so that information acquired and/or stored into database DB(1) by CPU 12(1) can be shared with DPU 12(2), . . . , DB(N) via database DB(2), . . . , DB(N) and vice versa. In one example embodiment, databases are provided numbering in X associated with N distributed processing units where N>=X and, for cases where X !=1, a communication link for synchronizing all of the X number of databases is also provided.

In the example shown, machine M looks to a DPU 12 for support, coordination, control or other functionality. In one example implementation, machine M includes a latency select LS to discover and select which DPU 12 to use. Selection between DPU 12(1), DPU 12(2), . . . , DPU(N) is based on how long it takes for machine M to receive responses. For example, machine M can send "pings", substantive inquiries or other messaging to DPU 12(1), DPU 12(2), . . . , DPU(N) to thereby set up an intentional race condition. Machine M can then choose the DPU with the fastest response time, e.g., the one that wins the race. Fast response time can indicate (a) low network or other communications latency on the communications path between machine M and the sooner-responding DPU 12; and/or (b) greater processing availability of the faster-responding DPU; and/or (c) better availability to the faster-responding DPU of relevant information needed to respond to the machine M's substantive request. Machine M can select one or several sooner-responding DPU's 12.

A particular DPU 12 might intentionally delay response if conditions warrant. Conditions can include but are not limited to available processing time, available memory and available network bandwidth. In short, the DPU 12 can delay if there is a shortage of any system resource ahead of system overload and/or thrashing which would affect in flight event processing. If any system resource is low, it is possible to delay the response to bias away from that unit. This maintains the 0 compute cycle decision making by the client/agent on that end where decision latency needs to remain low and resources are likely more constrained. In a more extreme situation, one DPU 12(1) might not respond at all due to damage, malfunction, communications breakdown, prearranged reservation and/or other factors, and machine M may therefore select the other DPU's 12(2) that do respond.

Any number of DPUs 12(1)-12(N) may communicate with machine M over any number of communications paths some of which can be different from others (e.g., some paths might be via the Internet or other network, other paths might be over leased, satellite or other dedicated or semi-dedicated communications links, and still other paths might be via alternate communications links such as point-to-point radio or microwave communications, power line telecommunications or other techniques). Machine M can be, comprise, or be coupled to an Agent 18 and communication is facilitated through an Agent Adapter 16 in the diagrams. For ease of understanding and reading, we will infer communication directly to a machine M with the understanding the machine M is or can be an Agent 18 and the agent adapter is the facilitator of those communications to and from the distributed processing units (diagrammed as DPU 12).

Machine M may cooperate with more than one distributing processing unit and rely on different distributing processing units for the same or different things. For example, one distributed processing unit may provide real time event processing and control whereas for another distributing processing unit may serve as a resource for storage, sensing or the like.

Once machine M selects a DPU(s) 12, it may continue to operate with that DPU(s) unless or until that DPU(s) fails, has increased latency or otherwise becomes a less optimal choice. During ongoing operations, machine M may continue to check latency to determine whether the DPU(s) 12 it is cooperating with is the best choice. If machine M determines that it would be better to cooperate with a different DPU(s) 12 (or if the DPU the machine has been cooperating with fails or otherwise becomes unavailable), machine M can change its selection and begin cooperating with a different DPU(s). Communications C between the respective DPU databases DB(1), DB(2) can be used to ensure that the respective databases are synchronized so that any DPU 12 can pick up where the other DPU left off without delay. Such communications C between databases DB(1), DB(2) can be conducted continually, intermittently, constantly, on demand or otherwise.

Figure 1A:
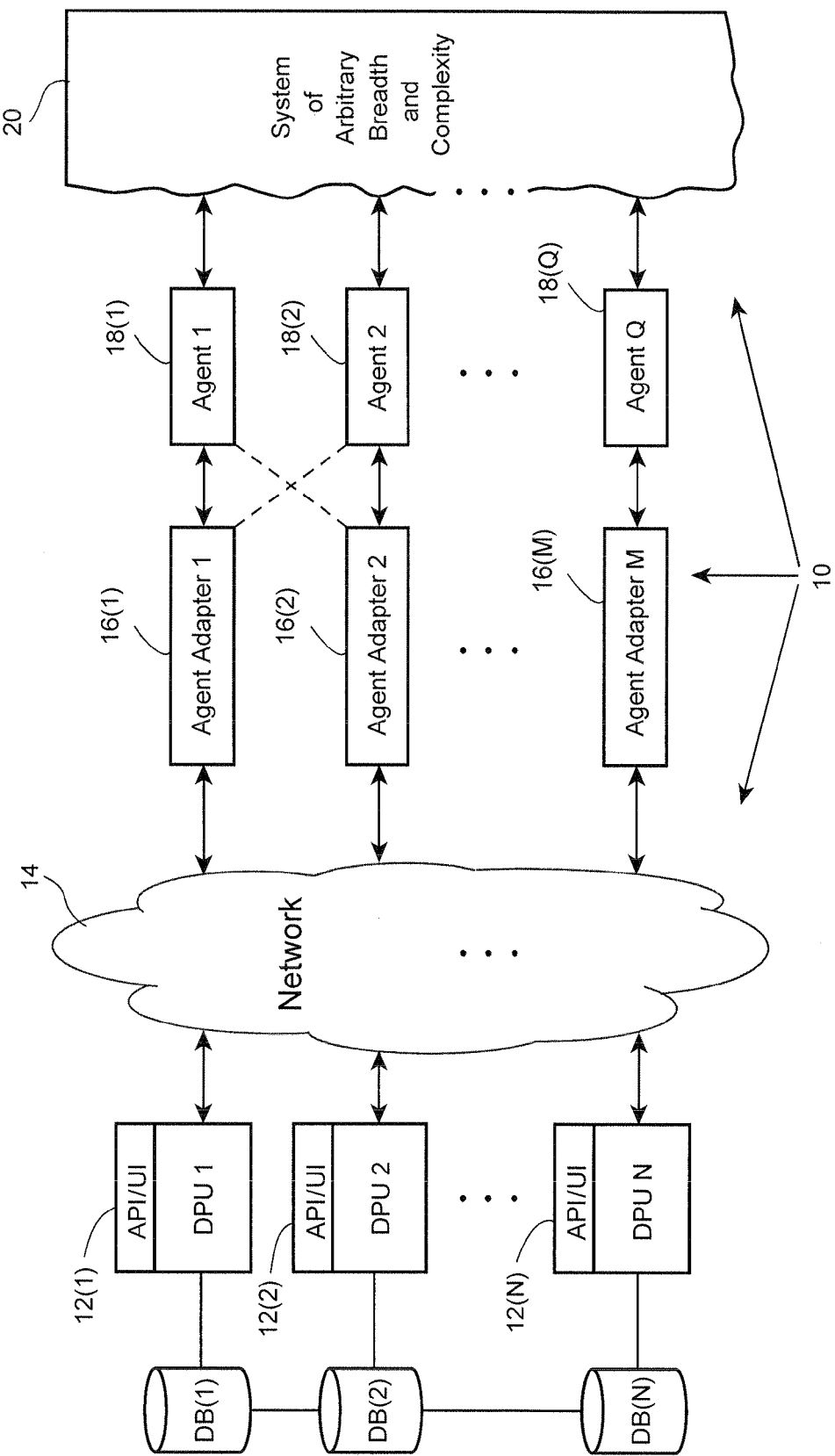

FIG. 1A shows a further embodiment wherein DPUs 12(1), . . . , 12(N) communicate with various machines via a streaming network 14. Streaming network 14 can be used to provide secure communications between DPUs 12 and/or to allow an external control or other arrangements to communicate with some or all of the DPUs. In the example shown, each DPU 12 uses network 14 to communicate with one or more Agent Adapters 16(1), 16(2), . . . , 16(M). In some example implementations, each DPU 12($x$) can communicate with a single Agent Adapter 16($x$). In other implementations, more than one DPU 12($x$), 12($y$) can communicate with each Agent Adapter 16($x$). In still other implementations, there can be more than one Agent Adapter 16($x$), 16($y$) for each DPU 12($x$).

Non-limiting embodiments are also designed to be implemented in redundant manner, so when there are multiple DPUs 12 available, an Agent Adapter 16 can fail-over automatically from DPU 12($x$) to DPU 12($y$) during an outage. In this way, the system provides a robust and redundant overall ecosystem. The technology also allows for "hot" deploys/removals. This means the system can be expanded or contracted quickly with minimal cost. As will be explained below, a selection algorithm is used to select which DPU 12 is to be used to send events to, control or otherwise communicate with any given Agent Adapter 16.

In the example shown in FIG. 1A, DPUs 12 can work through Agent Adapters 16 to access and/or control Agents 18, which in turn interact with system 20. Each Agent Adapter 16 communicates with one or more Agents 18. As will be detailed below, Agents 18 can interact with a System 20 of arbitrary breadth and complexity in any of a variety of ways. Some Agents 18 can control aspects of System 20, other agents can sense aspects of System 20, and still other agents can perform other operations in connection with System 20. Any given Agent 18 can perform any or all such functions.

Figure 2A:
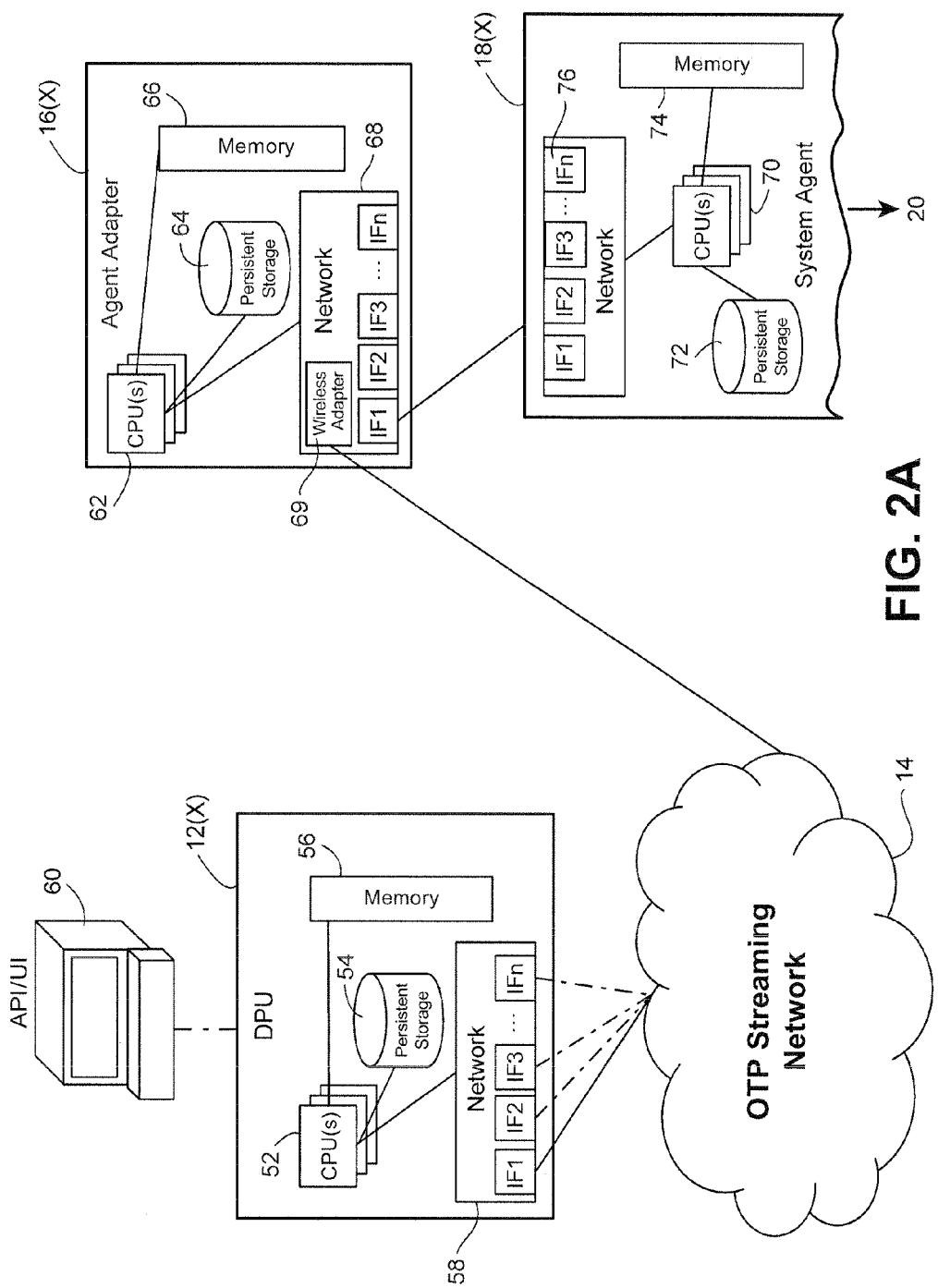

The FIG. 2A embodiment can be used to provide a cloud-based highly scalable solution with a high degree of automation that works with a homogeneous or heterogeneous set of elements. FIG. 2A shows a more detailed diagram of an example DPU 12($x$) coupled to streaming network 14, which in turn is coupled to Agent Adapter 16($x$) via a Wireless Adapter 69. Agent Adapter 16($x$) is coupled to System Agent 18($x$), which is coupled to or is part of system 20. In the example shown, DPU 12 may comprise one or more central processing units [CPU(s) 52], which can execute instructions stored in non-transitory Persistent Storage 54 and can Access Memory 56. One or more network interfaces permit DPU 12(*x*) to communicate with and via Network 14. An interface device 60 may provide an application programming interface (API) and/or user interface (UI) to provide input/output for DPU 12. An example non-limiting DPU based system is a Machine to Machine (M2M) interface that is faster, more redundant, scalable and can handle unlikely edge cases. In the ecosystem, any like or other DPU can back up any other, making the system exceedingly robust.

Agent Adapter 16 similarly may comprise one or more CPU's 62 coupled to persistent non-transitory storage 64 and memory 66. Network Interface 68 permits the Agent Adapter 16 to communicate with Network 14 (in the example shown, at least some such communications is wireless via wireless adapter 69). System Agent 18 also comprises one or more CPUs 70 coupled to Persistent Storage 72, memory 74 and Network Interface 76. In the example shown, DPU 12 communicates via Network 14 with Agent Adapter 16, which in turn communicates with System Agent 18. System agent 18(*x*) in the example shown includes CPU(s) 70, Persistent Storage 72, memory 74 and Communications Adapter 76. In the example shown, Agent Adapter 16(*x*) and System Agent 18(*x*) cooperate to exert control over and/or receive information from System 20. In some example embodiments, System Agent 18(*x*) and Agent Adapter 16(*x*) may comprise a single or distributed unit sharing resources.

Figure 2B:
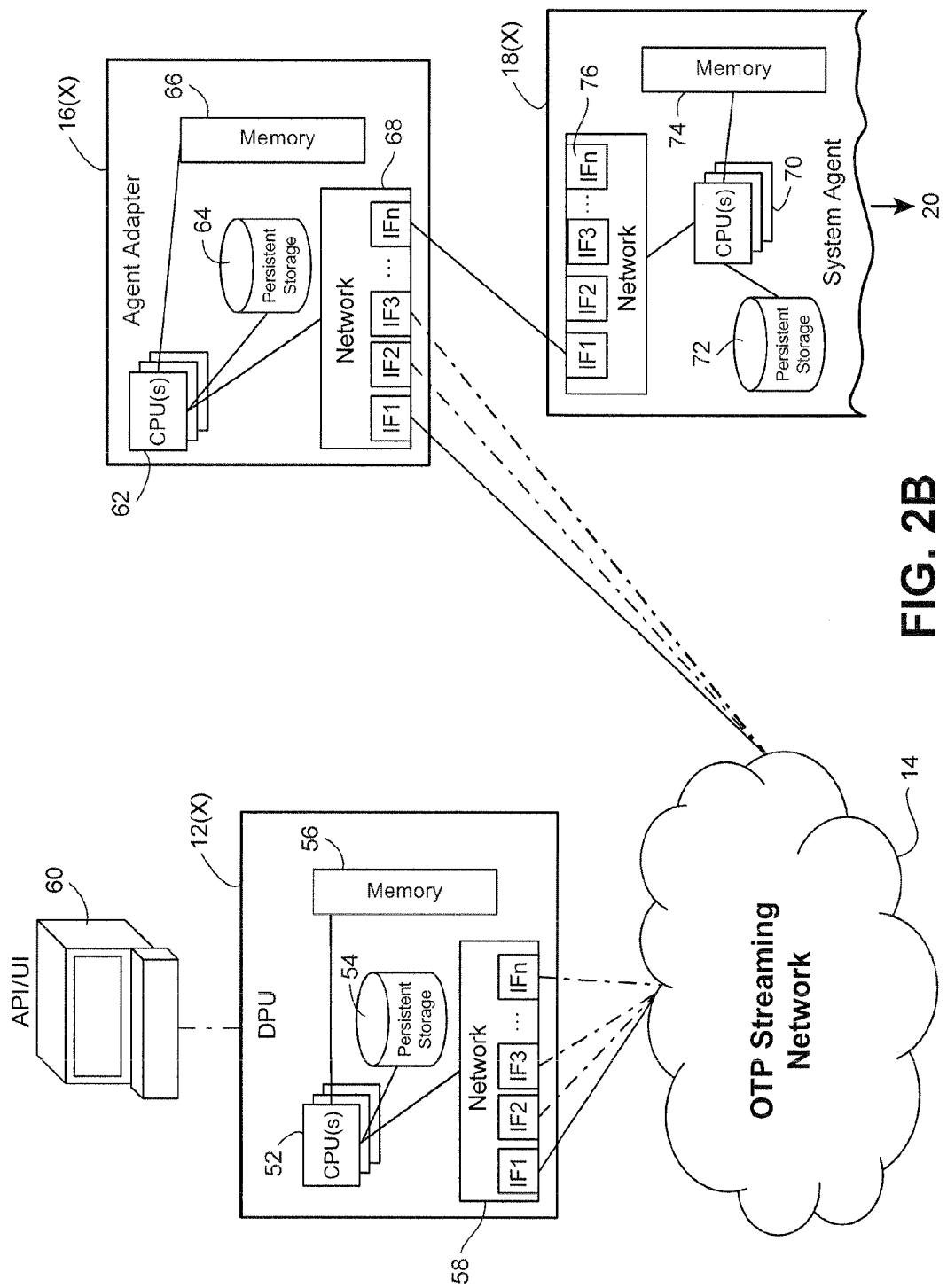

FIG. 2B shows a variation of the FIG. 2A embodiment omitting the Wireless Adapter 69 within Agent Adapter 16(*x*) and instead using various other network adapters in parallel for supporting communication between DPU 12(*x*) and the Agent Adapter.

Figure 2C:
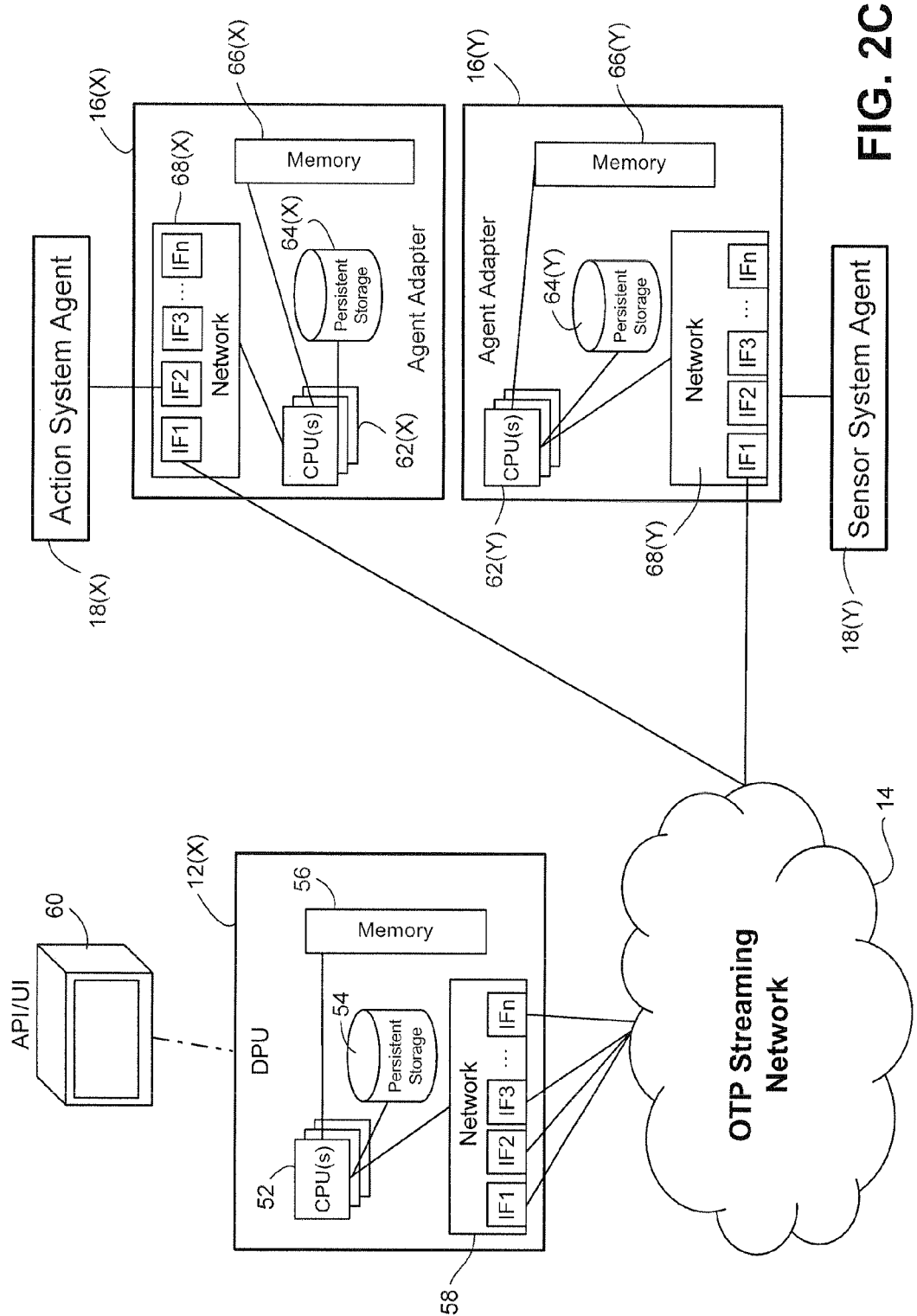

FIG. 2C shows a further non-limiting implementation where the Agent Adapter 16 is embedded into System Agent 18. One DPU 12(*x*) supports and interacts with plural System Agents 18(*x*), 18(*y*) directly.

FIG. 2D shows a further example of an embedded (e.g., chip based or other) implementation wherein the System Agents 18 each include a Wireless Adapter 69 enabling independent wireless communication with DPU 12(*x*) (in this case Streaming Network 14 may be a wireless streaming network).

Figure 3A:
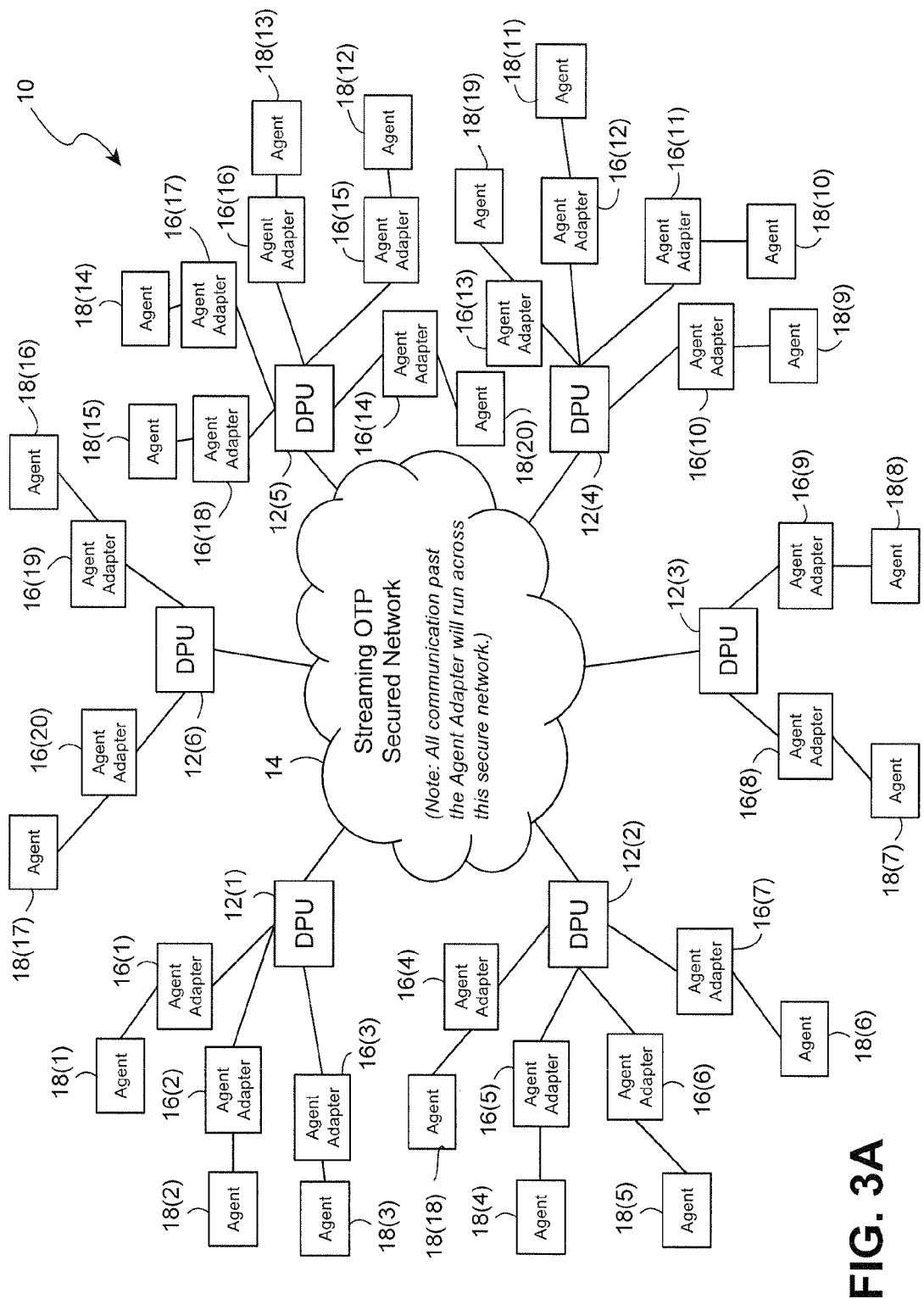
FIGS. 3A-3C are constellation diagrams of example non-limiting systems.
Figure 3B:
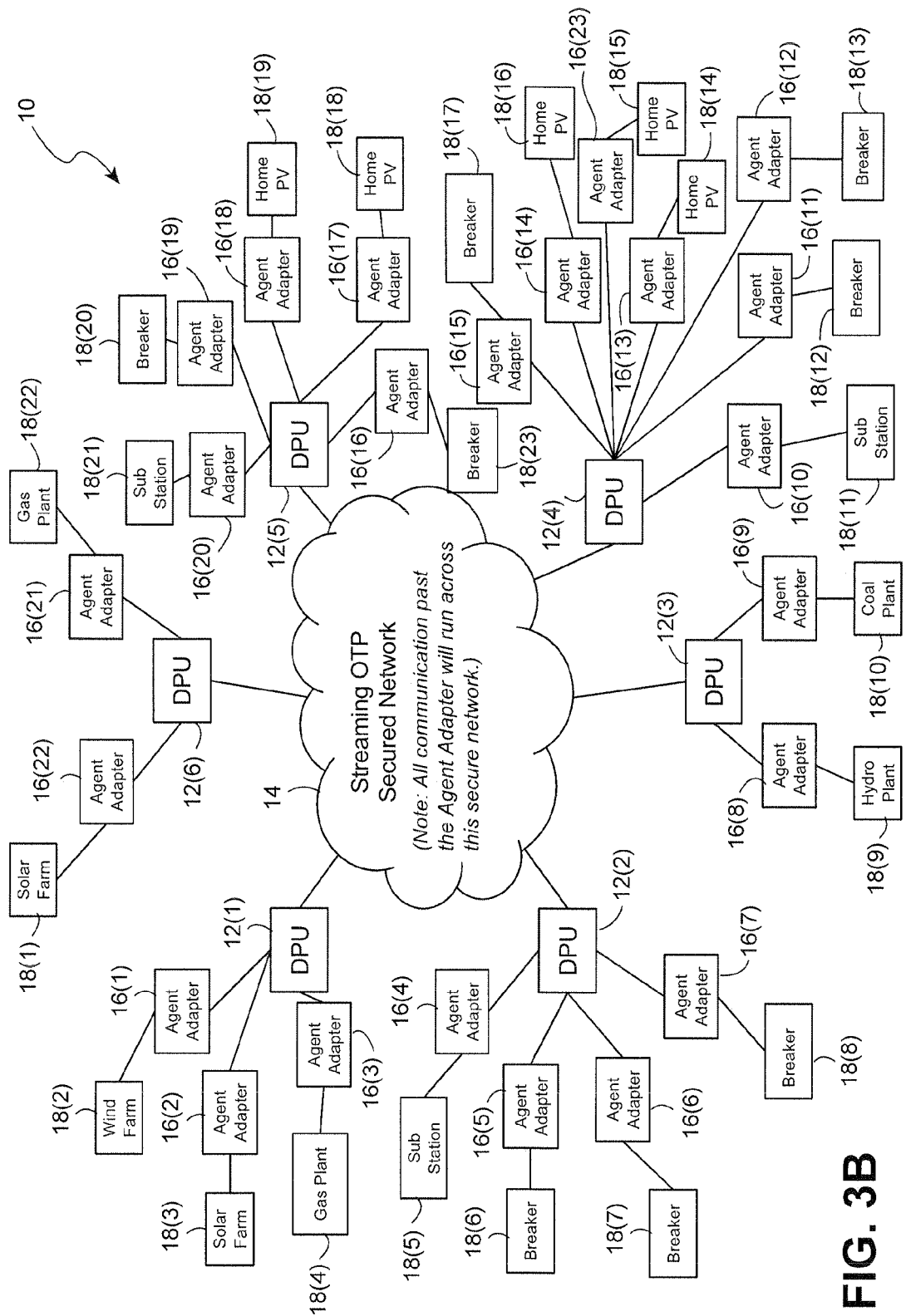
Figure 3C:
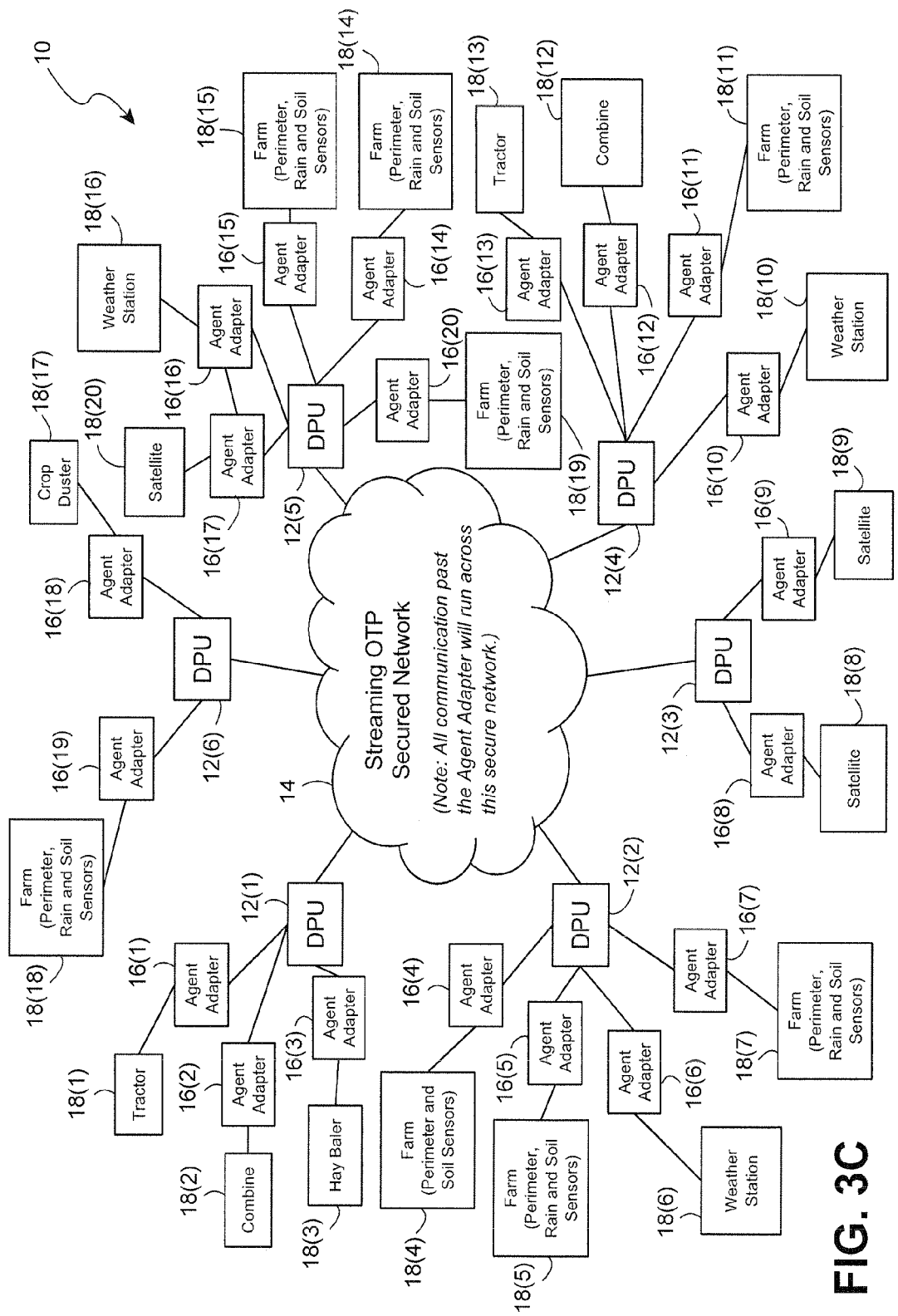

FIGS. 3A-3C show extended systems with many DPUs 12, Agent Adapters 16 and Agents 18. As can be seen, a DPU 12(1) may be coupled to three Agent Adapters 16(1), 16(2), 16(3) each of which is coupled to an associated respective Agent 18(1), 18(2), 18(3). Any given DPU 12 may be operatively coupled or associated with any number of Agent Adapters 16. FIG. 3B shows a particular example where the Agents 18 provide power grid control functionality through Wind Farm 18(2), Solar Farm 18(3), Breaker 18(6), Hydroelectric Plant 18(9), Coal Plant 18(10), Substation 18(11), Home Photo-voltaic (solar cell) system 18(18), and the like. FIG. 3C shows a further particular example where agents operate a farm and include farm machinery and equipment such as Tractor 18(1), Combine 18(2), Hay Baler 18(3), Farm Perimeter and Soil Sensors 18(4), Weather Station 18(6), Satellite 18(18), and the like.

Figure 4A:
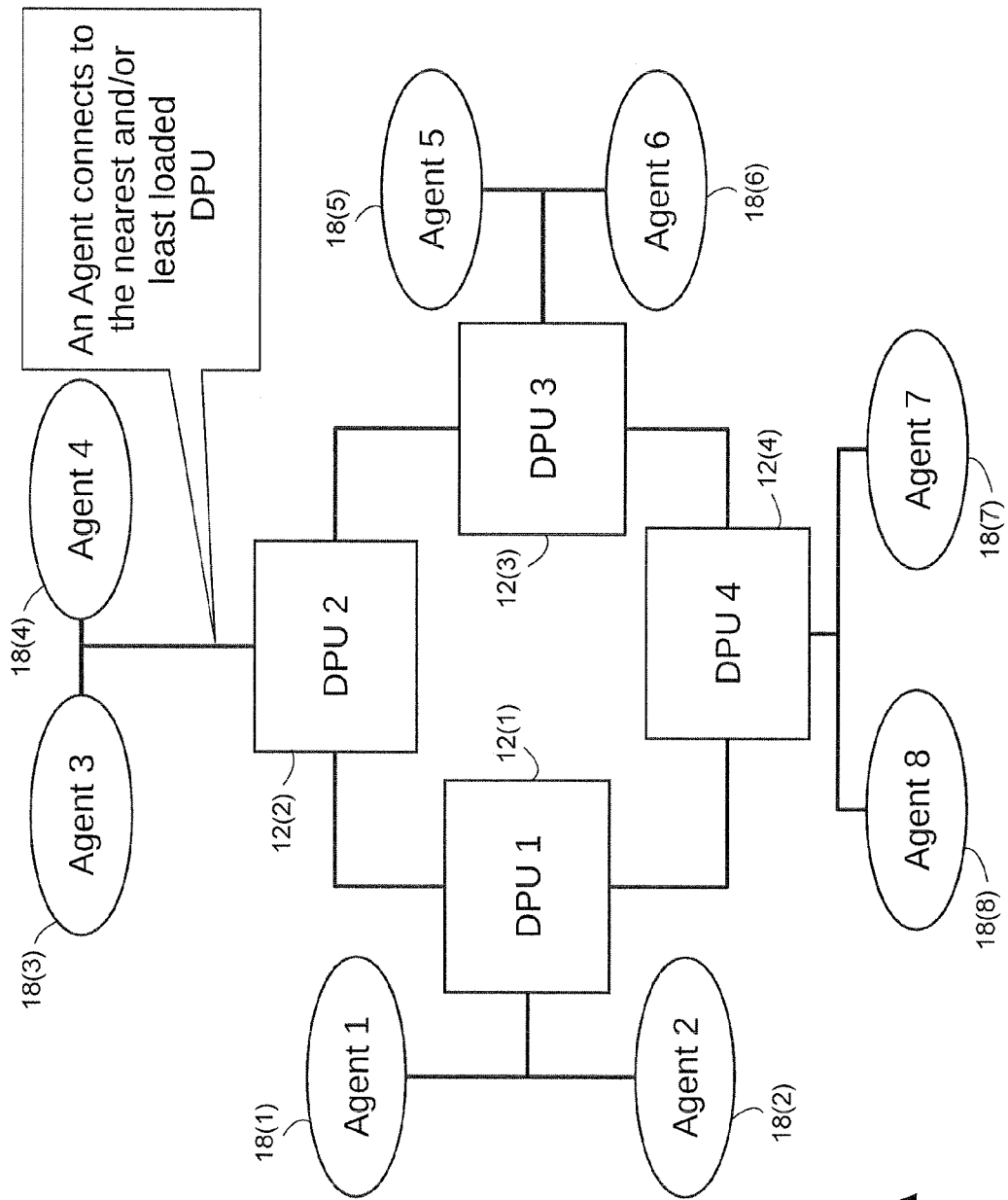
FIGS. 4A-4B show example non-limiting adaptability of the system.
Figure 4B:
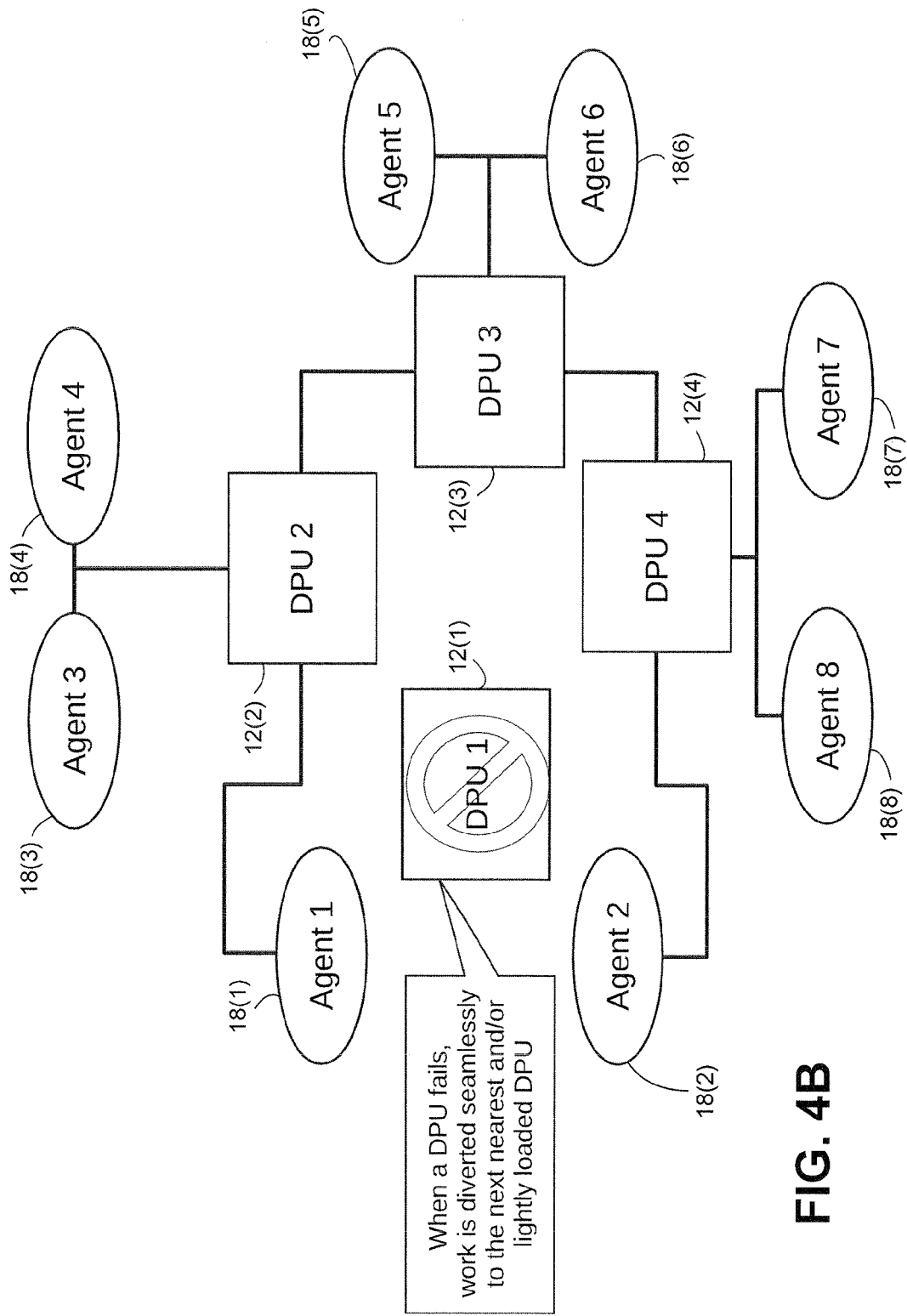

FIGS. 4A-4B show a scenario where a DPU 12(1) fails. In the example shown, each Agent 18 connects to the nearest and/or least loaded DPU 12. Thus, Agent 18(1) may contact, connect to and begin operating with DPU 12(1). However, as shown in FIG. 4B, when DPU 12(1) fails, work is diverted seamlessly to the next nearest and/or lightly loaded DPU 12 such as DPU 12(2). In this case, "nearest" may mean physically closest or closest in terms of network connectivity. For example, in some cases a more direct path across a network may exist between nodes that are actually physically more distant. By way of analogy, it may be easier to fly from New York City to Los Angeles than to fly from New York to Tyler Tex. even though Tyler is physically closer to New York than is Los Angeles. In this analogy, Los Angeles may be considered "closer" to New York from a network standpoint even though it may be a further actual distance. Similarly, bandwidth considerations may also apply so that the availability of a higher bandwidth path may (depending on the amount of data to be exchanged) make one DPU 12 preferred over another even if the physical, routing or other distance is actually greater.

Figure 5:
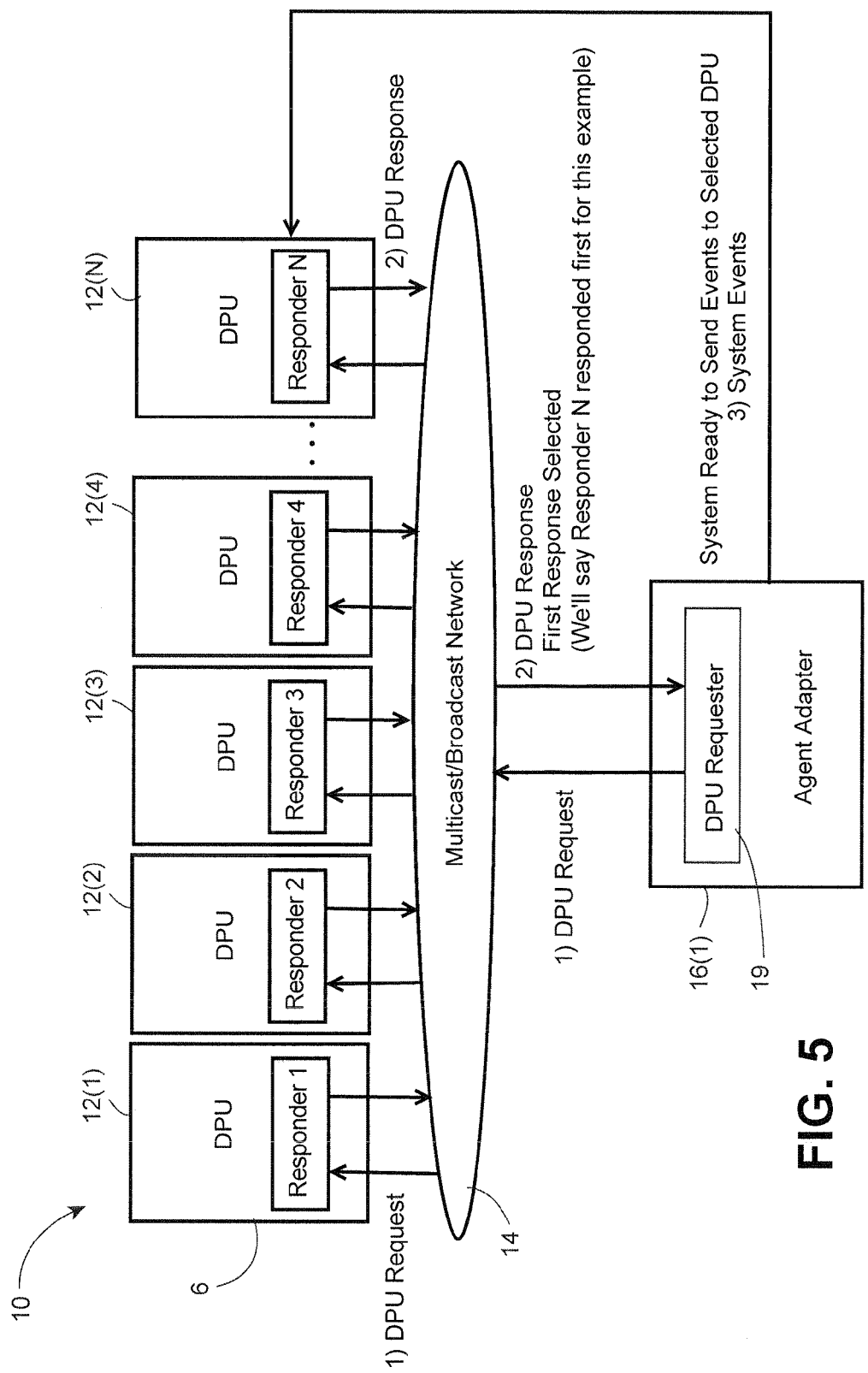
FIG. 5 shows example non-limiting Agent Adapter DPU registration.

FIG. 5 shows Agent Adapter DPU Registration. In this particular example, an Agent Adapter 16 generates processing request. The Agent Adapter's DPU Requester 19 multicasts/broadcasts the DPU request over Network 14 to DPU's 12. The DPU's 12 each respond by replying back over the Network 14 back to the DPU Requester 19. In one example embodiment, the DPU Requester 19 selects the first response received (suppose for purposes of this example that DPU 12(N) responds first) and passes the connection information on to the Agent Adapter 16. When the next system event occurs, the Agent Adapter 16 sends the associated event to the previously-selected DPU 12(N). Thus, DPU Selection in one non-limiting embodiment uses a Broadcast Request Reply design pattern to select the optimal processing unit.

Figure 9:
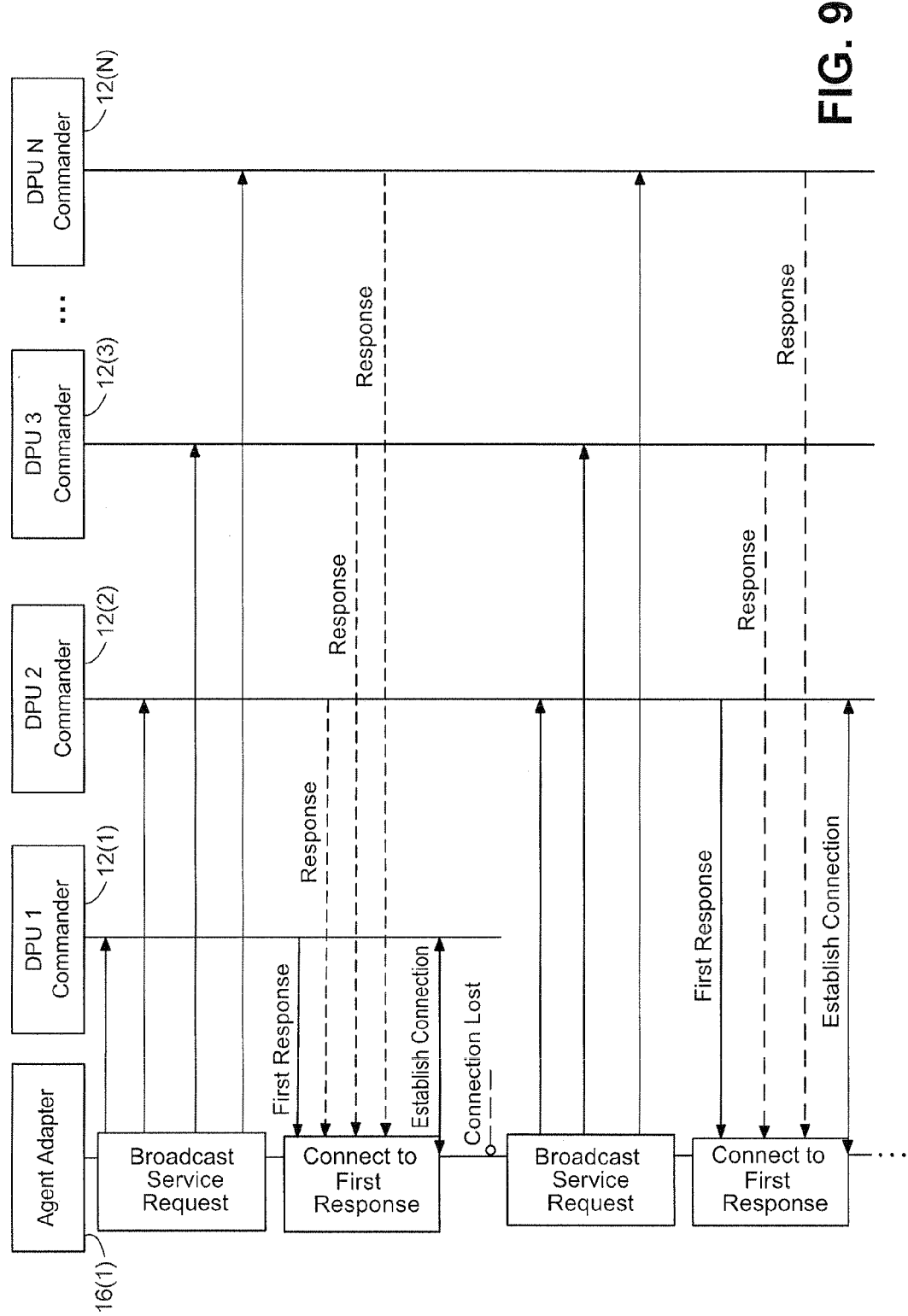
FIG. 9 is an example non-limiting data flow and timing diagram.

FIG. 9 shows this process in more detail. Starting at the upper left hand corner of the diagram, Agent Adapter 16 sends request to DPUs 12(1), . . . 12(N). Agent Adapter 16 establishes a connection with the first-responding DPU 12(1). If/when the connection is later lost, Agent Adapter 16 repeats the process and establishes a new connection with first-responding DPU 12(2). The DPU 12 Requester 19 and Responder 6 are implied in this example.

An example request contains the System Agent type. If the System Agent type is supported by a given DPU 12, the DPU's Responder 6 process responds with the information needed for that DPU 12's Connector 101 (see FIG. 6). The Requester 19 will accept the first response as being the optimal choice using the latency of the response to be the deciding factor. The Requester 19 will pass the information on to System Agent 18 supplying the connectivity information. Once that is chosen, requests are made to the selected item DPU 12 via an associated Connector 101. This process can and should be repeated periodically to make sure the optimal DPU 12 is selected. In the case where a response to a request does not happen fast enough or events are not acknowledge, this procedure should be repeated immediately and the event or request resent. (See FIG. 5.)

Figure 7:
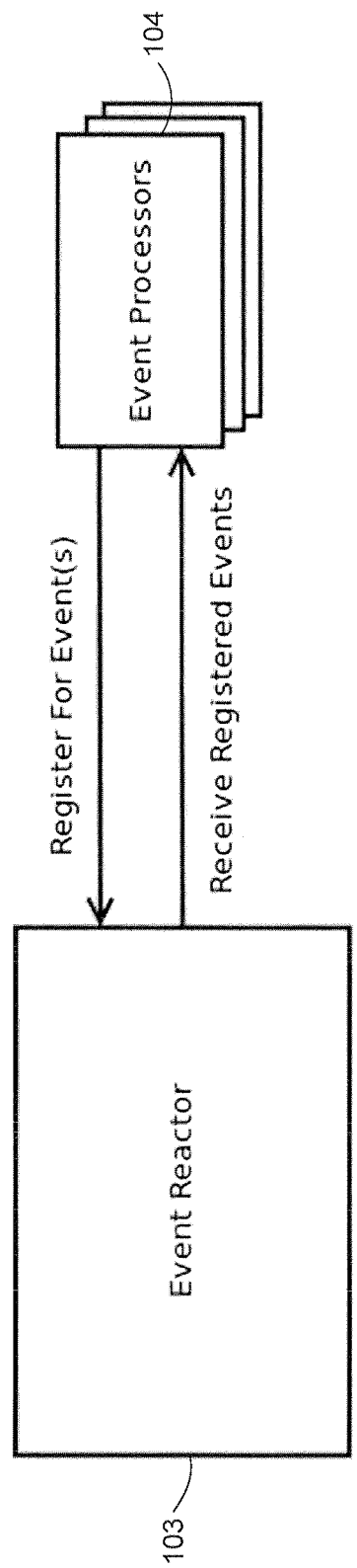
FIG. 7 shows a simplified view of Event Processor to Reactor (DPU internal) registration.

As shown in the FIG. 7 example Event Processor to Reactor (DPU internal) registration, Event Reactor 103 is the registrar for events that Event Processor 104 is interested in. Event Processor 104 may register with Event Reactor 103 for multiple events.

Figure 6:
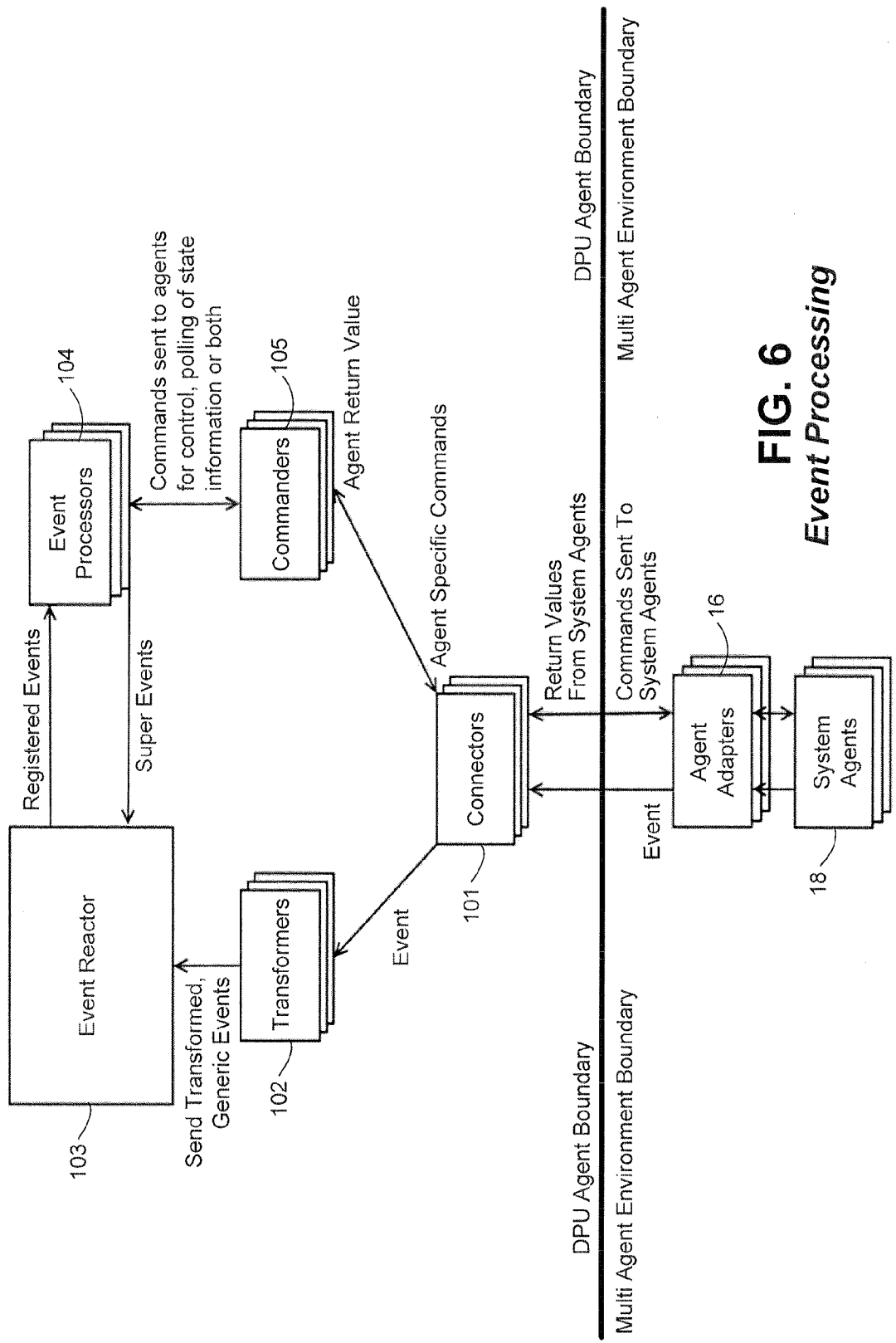
FIG. 6 is a more detailed diagram of example non-limiting event processing.

FIG. 6 shows non-limiting event processing including the following components:

1. Connectors 101—Controls communication between the system and machines and data sources.
2. Transformers 102—Transforms messages from different machines into a common format
3. Event Reactor 103—Takes events from different data sources (including machines) and routes them to appropriate processors.

4. Event Processors 104—Registers for various events, analyzes the input and takes actions.
5. Commanders 105—Sends commands to different systems in the ecosystem and allowing them to access in a common way.
6. Agent Adapters 16—Connections and handles communications between the System Agent 18 and the DPU 12.
7. System Agent 18—An external device or system that sends events and/or can be controlled by the system. This can be a System Element or another system all together (SoS arrangement).
8. DPU 12—Collection of items 1-5 that works as a single processing unit.

Figure 8:
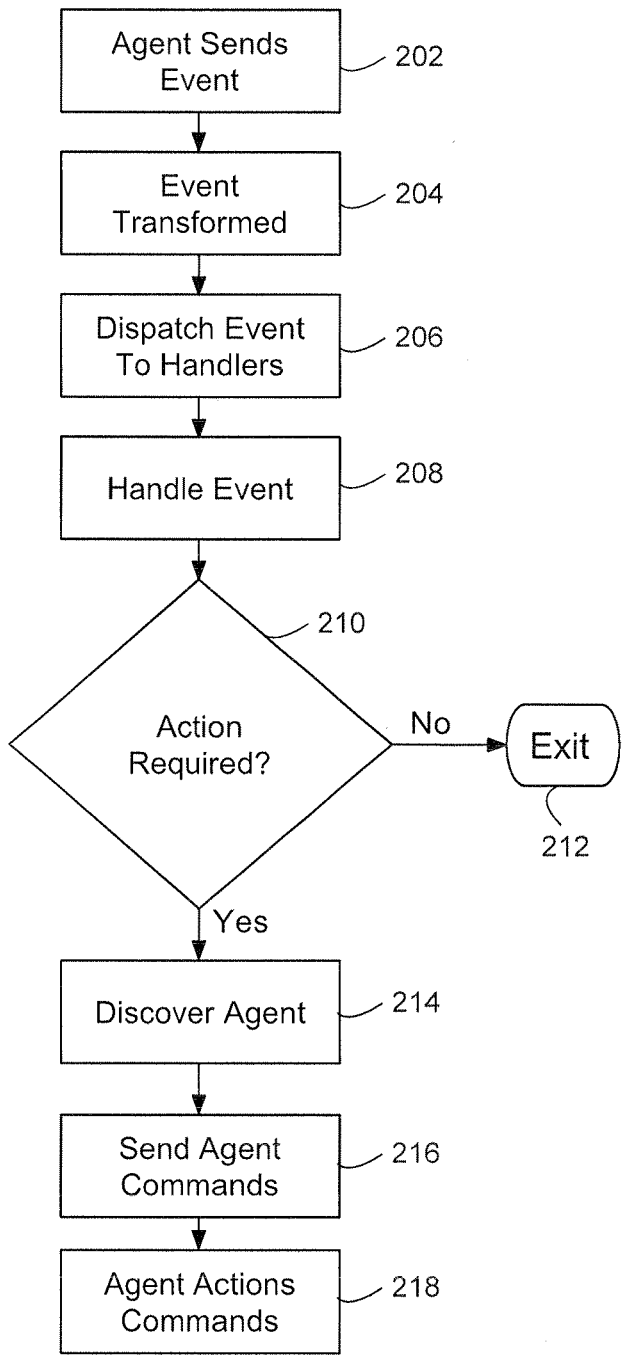
FIG. 8 is an example non-limiting flowchart.
Figure 10:
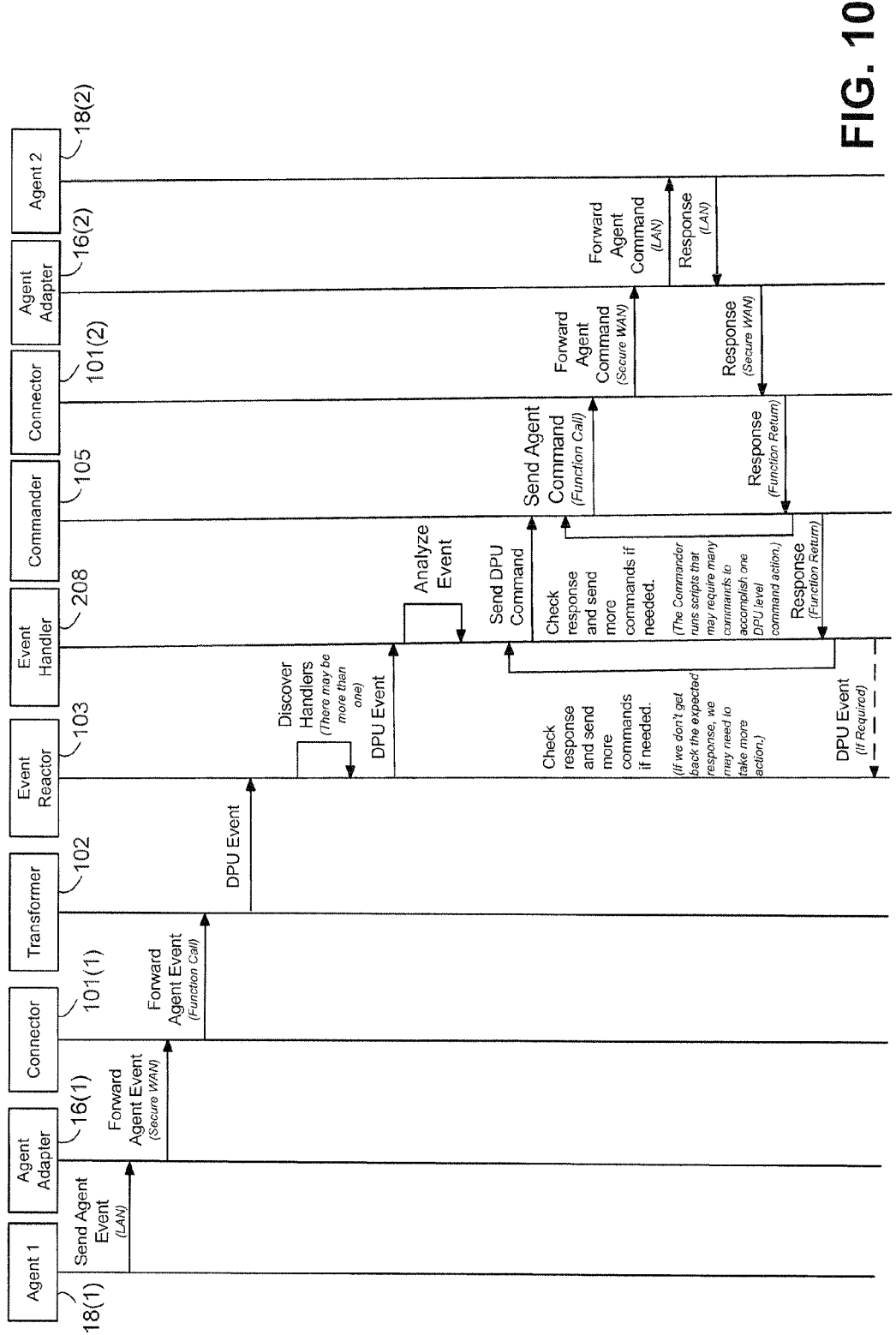
FIG. 10 is an additional example non-limiting data flow and timing diagram.

In the example shown in FIG. 10, the System Agent 18 sends messages and event information through Agent Adapter 16 and Connector 101 (FIG. 8 block 202) which in turn sends messages and events to Transformer 102 to allow them to be transformed (FIG. 8 block 204) into a common, system specific format. Transformer 102 sends system specific events to Event Reactor 103 for distribution to Event Processors 104 (FIG. 8 block 206) and if necessary, discovery of handlers (there may be more than one). Event Processor 104 receives events it has registered for from the Event Reactor 103, analyzes the data and, when analysis dictates, takes one of two actions (FIG. 8 blocks 208, 210):

1) Sends data back to Event Reactor 103 as a new type of event (recursive call); or
2) Sends a command or commands to Commander 105 to take action or poll for information from System Agents 18 through Connector 101. Connector 101 sends any responses from System Agent 18 back to Commander 105 which in turn returns a possibly modified response to Event Processor 104. (See FIG. 6; FIG. 8 blocks 214, 216, 218). Depending on the response, more commands may be sent to any required System Agent 18 if needed (this is also possible for sending back super events). This continues until the event handling is satisfactorily completed. It is also possible that after commands/replies are compete, option 1 may be invoked and a new event sent to the reactor. This encompasses both actions 1 and 2 respectively.

The example System 10 allows elements/agents to be connected and controlled by a selected DPU(s) 12. The type of control and the type of elements/agents can vary depending on the particular application. This is a framework to use in multiple industries for wide area control over disparate systems working in a common ecosystem. There are four parts to describing a working system:

1. Define the abstract methods or representation for a problem domain (abstract Commander 105 and Transformer 102).
2. Define the concrete Commander 105 and Transformers 102 for each System Agent 18 types for a given digital ecosystem.
3. Create or configure concrete Connectors 101 for each System Agent 18 type.
4. Describe the defined system interactions. This is accomplished with particular implementations of Event Processors 104. This also may possibly discover abstract Commander 105 methods and use particular implementations of those methods per commander 105 type.

Once the DPU 12 is ready to use for a given digital ecosystem, the system interactions start.

The first step is for an Agent Adapter 16 to decide the optimal DPU 12 to use. In one example embodiment, this is done using the Broadcast Request-Reply design pattern. The request can be sent by the DPU Requester 19 to all Responders 6 on DPUs 12 via Multicast/Broadcast Network 14 with a payload of the System Agent 18 type. All DPUs 12 with support for the System Agent 18 type return a response to the DPU Requester 19. The first response to the request will be the selected DPU 12. The DPU Requester 19 will pass on the information to the Agent Adapter 16 to allow requests to be made directly to the selected DPU 12. This process should be repeated periodically to ensure the optimal DPU is being used. The process will also be repeated on connectivity failure.

Once that is decided, System Agent 18 events are sent to the Connector 101, generalized through the Transformer 102 and passed on to the Event Reactor 103. The Event Reactor 103 uses a Reactor design pattern to allow Event Processors 104 to register for events they are interested in. The Event Reactor 103 then brokers events to the interested Event Processors 104 to be evaluated and potentially acted upon.

The Event Processor 104 takes events potentially from multiple data sources and processes them. This can be done with simple conditional logic, more complex AI algorithms, through an analytics engine or any other method or combination of methods possible. If the Event Processor 104 deems action needs to be taken based on received information, one of two things can be done:

1) The Event Processor 104 may create a super event that can be fed back into the Event Reactor 103 for processing by other Event Processors for further analysis; or
2) It can send commands through the Commander 101 and then Connector 101 to various elements to either gather more information directly from System Agents 18 or send commands to take automated action on System Agent(s).

Choice 2 may also invoke choice one based on the response. In that situation, both commands are sent and a super event created.

At this point the event has been received, processed and acted upon.

Below are the common logic gates for the abstract system:

Event Reactor 103—Given an event, for each Event Processor 104 registered for that event type, send the event.

Event Processor 104—Given event(s), if a threshold is violated, either: 1) create a new event to the Event Reactor 103; 2) send commands to the Commander 105 which in turn sends specific commands to a the given System Agent 18; or 3) Combine 2 and 1 to send commands and then create a new event based on the response(s).

DPU Requester 19/Responder 6—The Requester 19 sends a request to all Responders 6 with the System Agent 18 type for the request. If the DPU 12 supports the System Agent 18 type, the Responder 6 within the DPU 12 returns connection information for that DPU's Connector 101 for the given System Agent 18 type. The first response is selected.

The first step to creating a solution for a given industry or problem domain is to define the high level events and commands to be supported. Once those are well understood, abstract classes for the Commander 105 and Transformer 102 are created. There may be several classes of events and controls so there might be more than one abstract class defined. Next, concretely define the Commander 105 and Transformer 102 classes per System Agent 18 type.

Once those are defined, the communications protocols to be used can be understood. Connectors 101 for each communication protocol to be encountered needs to be added or, if not available, created/developed for the code base.

The next step is to create the Event Processors 104 and the logic needed for taking action on given generic events.

Functionality may be identified based on particular applications by industry users and what they desire to automate, control and/or report on.

Once those programming steps are complete, we are ready to create a physical DPU 12. The DPU 12 consists of an independent computer system with a CPU, storage, memory and connectivity (networking) plus an installed version of the code base created earlier.

A Multi-cast/Broadcast network 14 will then be established and the DPU 12 Requester 19 and Responder 6 configured to use it.

Once DPUs 12 are created, the physical unit needs to be connected to and configured for the Network 14. The System Agent 18 will also need connectivity to this Network 14. To accomplish this, the System Agent 18 connects directly, over a Local Area Network (LAN), through a serial interface or any other connectivity method conceivable to the Agent Adapter 16. The Agent Adapter proxies all System Agent 18 to DPU 12 communications. Once this is complete and communication verified, the assimilation of the System Agent 18 into the MAS 10 is complete.

One optional component would be the Requester 19/Responder 6. The system can be used without it but use of such components adds to system robustness and scalability features. The example non-limiting embodiment also provides System Agents 18 to be configured with DPU connection information, making the system more brittle as each element will be bound to a DPU 12 or need to maintain connectivity information for all DPUs 12.

Conversely, the Requester 19/Responder 6 can be used standalone for other frameworks or systems. It can in fact, in one embodiment, it can be used as its own component to distribute load across a bank of web or other services.

Other optional components are the Transformer 102 and Commander 105. These would be optional in a situation where all events and commands were the same for all elements or the elements were different enough that there was no commonality. In these cases, the Connector 101 could pass events directly to the Reactor 103 and the Event Processor 104 can send commands directly to the Connector. You might see this where the example non-limiting framework is used for a SCADA system or plant automation where all System Agents 18 are machine elements and each is unique and/or containing sets of homogeneous elements from a vendor/command perspective or they are using a protocol standard that is well adhered to.

In a wide area configuration, to make the system exceedingly secure and ensure the lowest possible network latency, the DPUs 12 can be connected across a private line transport Network 14. This allows the purveyor of the System 10 to completely control the network and data. The System Agents 18 could also be added to this network through private lines to increase the security of the network. Bastion hosts could be added to allow access from the public Internet for when desired. The bastions could also work as a fall back to the public Internet in the case of private network disruption or connectivity issues.

It is possible to spread the DPU 12 components across separate computers creating a cluster or bank of functionality for each component. Components could be mixed or separated depending on parallel and/or real-time processing needs. This would be lucrative if one component was requiring a lot of processing while others need guarantees against being blocked. In this case, the DPU 12 Requester 19/Responder 6/can be reused to facilitate load balancing across the cluster. This also has other aforementioned benefits of hot deploys/removal of computing resources and robustness at a component level.

This type of configuration would be very likely in situation with high levels of automation or learning AI that requires massive processing. In these examples the Event Processors could be run on a large cluster of computers while the other elements are run on more modest hardware. This allows the bulk of the processing to be handled with potentially massive processing resources while the rest of the components could probably be well served on a single computer. This also ensures that the potential large processing needs of the Event Processor 104 will not interfere with the critical and time sensitive act of receiving events.

Example I

Example I controls an electrical grid. The flow of the electrical grid is controlled by dispatch centers. The system would initially be engineered to enhance the dispatching centers but, as iterative development increases capabilities, eventually those centers should be phased out.

The real utility comes with the advent of smart grids. The amount of data such as weather, spot utilization from appliances, supplemental energy from home solar panels and other data considerations makes it increasingly difficult if not impossible for human agents to accurately process all the information in a timely manner. Handling this as a DPU 12 MAS 10 solves this problem and allows the data to be processed and reacted to near real time.

To do this in an optimal manner, the DPUs 12 should be distributed in a wide geographic region. In this way, this system increases the robustness of the electrical grid's MAS 10. Instead of a single dispatch centers for an area, multiple DPUs can be deployed over a wide geographic region. This can be done at a fraction of the cost of running dispatch centers.

While the energy grids are one example, the present technology can be applied to any grid/network problem. There are many industries that would benefit equally well from automation in a wide area.

Additionally, on a smaller scale, a specific utilization can be burned onto chips and used in embedded systems or included as subsystems with a microcomputer. The example technology can now be used to control and automate any single unit that reacts to events and requires automation (cars, planes, robots, . . . ). The DPU 12 MAS 10 solution also allows for redundancy and automatic fail-over even at a small area single unit MAS level.

Example II

Figure 11:
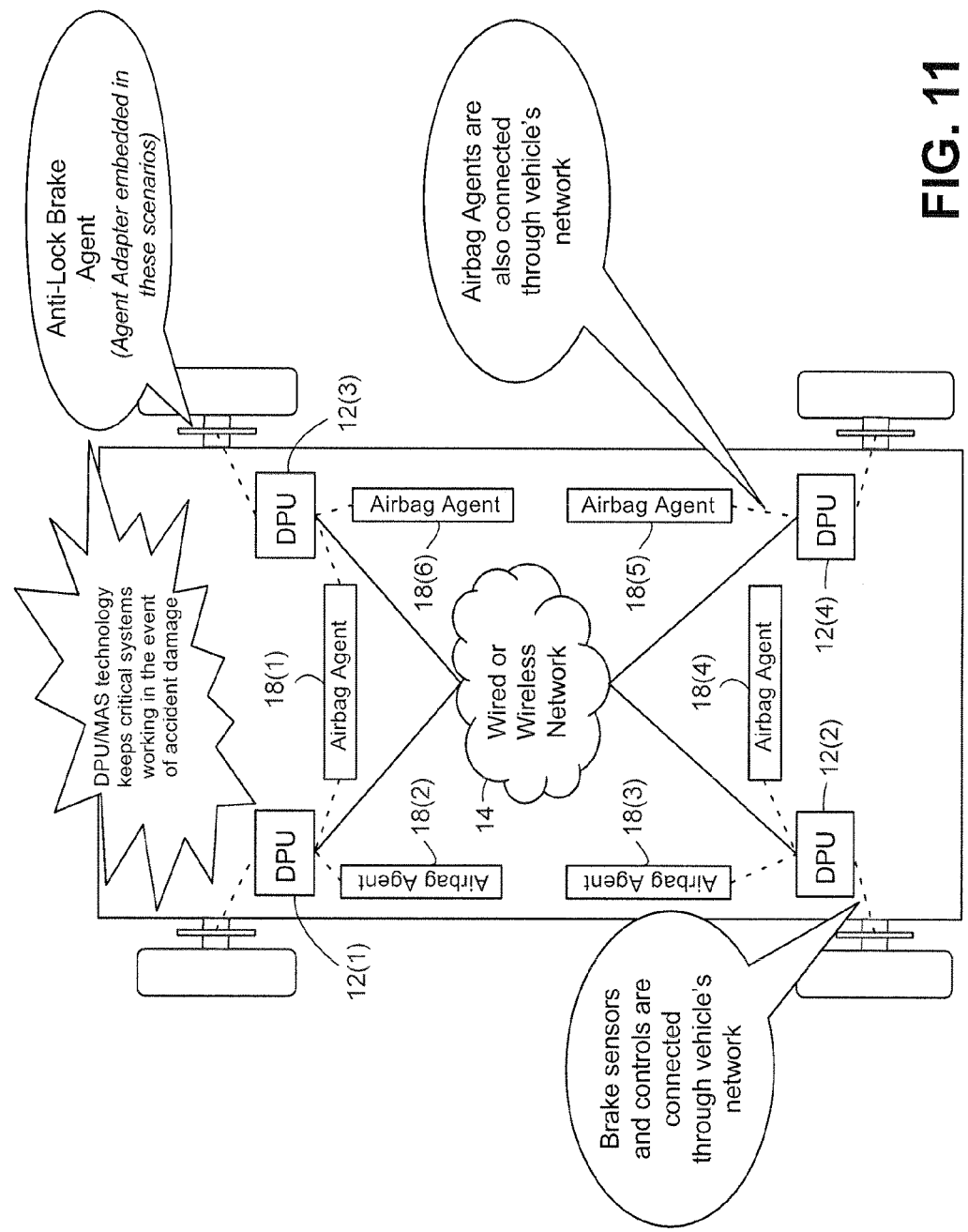
FIG. 11 shows an example non-limiting vehicle application.

FIG. 11 show a further example of a motor vehicle using MAS 10 to control critical systems. In the example shown, MAS 10 keeps critical systems working in the event of accident damage. In particular, DPU 12(1) may perform traction control, auto braking and other critical safety features. DPU 12(3) could act as the anti-lock brake agent (this DPU is likely to be an embedded processor in such an application). Airbag agents are also connected through the vehicle's wired or wireless Network 14, and brake sensors and controls are connected through the vehicle's network. In the event of an accident that damages a DPU 12, the MAS 10 immediately recovers when affected airbag Agent 18 uses the Agent Adapter 16 to establish a connection with alternative DPUs 12.

Other Example Applications
Water Utility Coordination and Dispatch
Oil and Gas Coordination and Dispatch
Network operations automation
Network Access Service Request (ASR) Automation
Defense System Control, Coordination and Automation
Robots
Drones
SCADA
Automated Safety Systems for automobiles and airplanes
Exchange and Trading Automation
Medical Systems Coordination and Automation
Machine to Machine Controller
System of System Controller
Any MAS That Requires Event Driven Coordination and Automation While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A distributed control system comprising:
   intelligent agents;
   a network of distributed processors; and
   intelligent event generators operatively coupled to the network of distributed processors, the intelligent event generators being configured to generate events, the intelligent event generators being further configured to discover distributed processors and assign particular distributed processors to handle generated events by sending messages to the network of distributed processors that set up test conditions for selecting between distributed processors, the intelligent event generators assigning particular distributed processors to handle the generated events based on determined response latency revealed by the test conditions;
   said distributed processors being configured to provide event reactors that react to events generated by the intelligent event generators, the distributed processors dispatching commands to at least one intelligent agent for action using an event communication protocol abstraction arrangement comprising a transformer configured to transform generated events into a common event format and a commander configured to send intelligent agent specific commands to one or more of the intelligent agents for action.

2. The system of claim 1 wherein the intelligent event generators discover distributed processors by setting up intentional race conditions between distributed processors and measuring responses by said distributed processors to said intentional race conditions.

3. The system of claim 1 further including an event dispatcher that dispatches events to handlers provided by the assigned distributed processors.

4. A control process comprising:
   sending a request to N distributed processing units setting up a test condition, where integer N>1;
   determining, with an event generator comprising a processor, which of the N distributed processing units respond sooner thereby determining relative response latency of the N distributed processing units;
   selecting, with the event generator comprising the processor, the sooner-responding of the distributed processing unit(s) and assigning the selected distributed processing unit(s) to handle generated events, the event generator assigning particular distributed processing unit(s) to handle generated events based on determined response latency revealed by the test condition;
   establishing a connection and associated control relationship between the event generator comprising the processor and the selected distributed processing unit(s); and
   using an event communication protocol abstraction arrangement comprising a transformer configured to transform generated events into a common event format for handling by the selected distributed processing unit(s) and a commander configured to send intelligent agent specific commands to one or more intelligent agents for action.

5. The process of claim 4 further including synchronizing a database associated with a first of the N distributed processing units with a database associated with a second of the N distributed processing units.

6. The process of claim 4 wherein the determining measures latency of an intentional race condition between at least some of the N distributed processing units.

7. The process of claim 4 further including repeating the method upon detection that the established connection is broken.

8. The process of claim 4 further including:
   receiving an event from an agent;
   dispatching the event to handlers;
   handling the event;
   discovering an agent; and
   sending the agent commands for action and response.

9. The process of claim 4 further including:
   sending and forwarding agent events through a connector and the transformer to an event reactor;
   analyzing the event(s); and
   generating one or more agent commands, discovering one or more appropriate agents to receive the commands and forwarding the agent commands to the discovered one or more appropriate agents; and
   checking response(s) and sending more commands if needed.

10. The method of claim 4 further including a distributed processing unit selectively delaying response to the processing resource requester based on resource availability.

11. The method of claim 10 wherein the resource comprises at least one of processing time, memory and network bandwidth.

12. A distributed control system comprising:
   N distributed processing units, N>1;
   a network coupled to the N distributed processing units;
   a processor coupled to the network, the processor sending messages to the N distributed processing units over the network that set up test conditions for the N distributed processors and determining, based on replies thereto, which of the N distributed processing units responds first;
   the processor being configured to select the first-responding one of the N distributed processing units and assign the selected distributed processing unit to handle generated events, the intelligent event generators assigning particular distributed processing units to handle the generated events based on determined response latency revealed by the test conditions;
   the processor establishing a control relationship with the selected and assigned distributed processing unit; and
   an event communication protocol abstraction arrangement comprising a transformer configured to transform generated events into a common event format for handling by the selected distributed processing unit and a commander configured to send intelligent agent specific commands from the selected distributed processing unit to one or more intelligent agents for action.

13. The system of claim 12 further including a database associated with each of N distributed processing units, and a communication link for synchronizing all of the N number of databases.

14. The system of claim 12 further including databases numbering in X associated with N distributed processing units where N>=X and, for cases where X !=1, a communication link for synchronizing all of the X number of databases.

15. The system of claim 12 wherein the processor determines the winner of an intentional race condition between the N distributed processing units.

16. The system of claim 12 wherein the processor repeats selection upon detection that the established connection is broken.

17. The system of claim 12 further including event reactors, event processors and wherein the transformer transforms events for processing by the event reactors and the event processors.

18. The system of claim 12 wherein the processor is configured for:

receiving an event from an agent;
dispatching the event to handlers;
handling the event;
discovering an agent; and
sending the agent commands for action by the agent.

19. The system of claim 12 wherein the processor is configured to:

send and forward agent events through a connector and the transformer to an event reactor;
analyze the event;
generate one or more agent commands;
discover one or more appropriate agents to receive the commands and forwarding the agent commands to one or more agents; and
check response and selectively send more commands in response to the checking.

20. The system of claim 12 wherein at least some of the N distributed processing units selectively delay responses to the processing resource requestor based on a predetermined condition.

21. The system of claim 20 wherein the predetermined condition is selected from the group consisting of available processing time, available memory, and available bandwidth.

* * * * *